F. NEUMEISTER & H. C. BURHOP.
CATTLE STANCHION.
APPLICATION FILED FEB. 14, 1907.
901,366.
Patented Oct. 20, 1908.
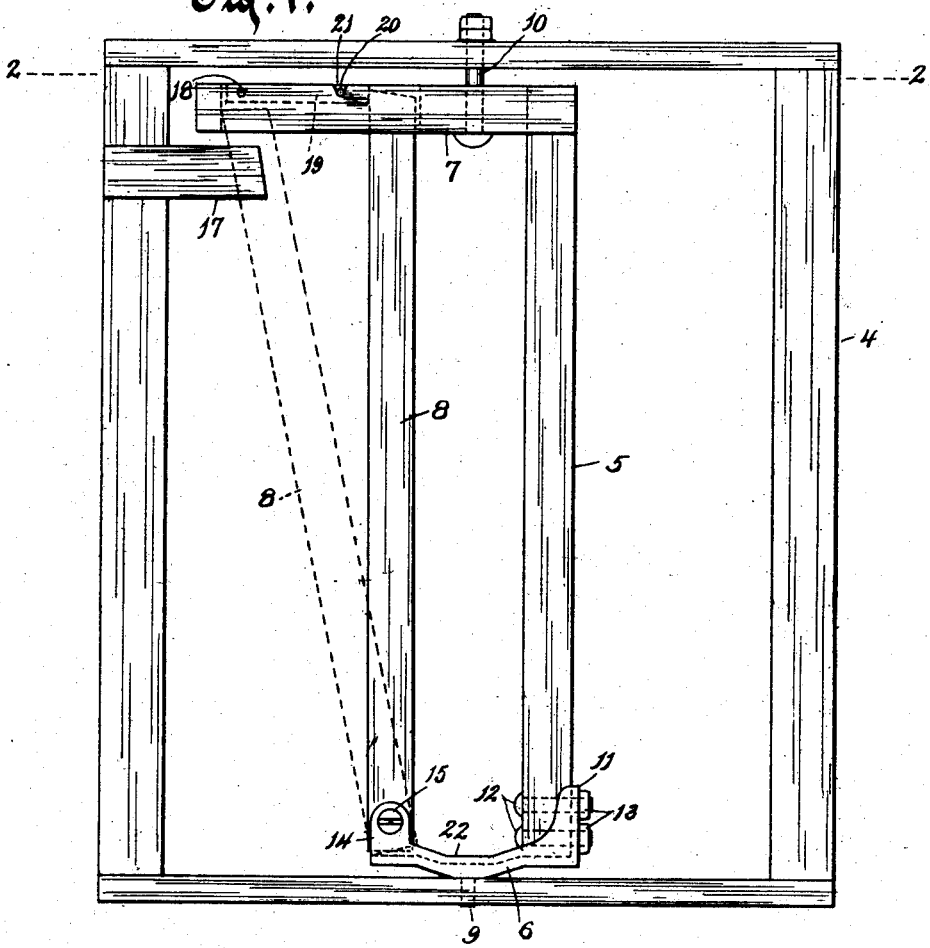
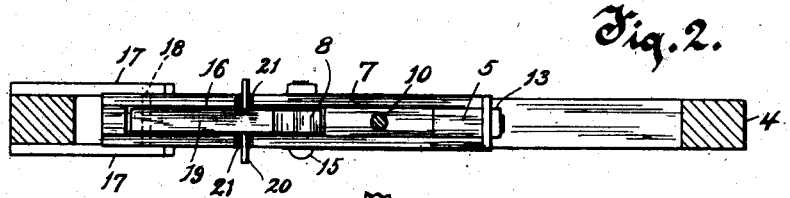
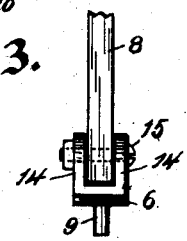

UNITED STATES PATENT OFFICE.

FERDINAND NEUMEISTER AND HERMAN C. BURHOP, OF HOWARDS GROVE, WISCONSIN.

CATTLE-STANCHION.

No. 901,366.　　　　Specification of Letters Patent.　　　Patented Oct. 20, 1908.

Application filed February 14, 1907. Serial No. 357,274.

*To all whom it may concern:*

Be it known that we, FERDINAND NEUMEISTER and HERMAN C. BURHOP, both residing in Howards Grove, in the county of Sheboygan and State of Wisconsin, have invented new and useful Improvements in Cattle-Stanchions, of which the following is a description, reference being had to the accompanying drawings, which are a part of this specification.

Our invention has relation to improvements in cattle stanchions.

The object of the invention is to provide an improved form of cattle stanchion possessing the advantageous features of construction as hereinafter more fully pointed out.

In the accompanying drawing, Figure 1 is a front elevation of the improved cattle stanchion; Fig. 2 is a cross section on the line 2—2 of Fig. 1; and Fig. 3 is an end view of the lower connecting bracket, the lower portion of the stanchion bar which is pivoted thereto being also shown.

Referring to the drawing, the numeral 4 indicates the frame of the stall within which the stanchion is located. The stanchion proper consists of the upright stanchion post 5, the lower bracket or arm 6, the upper post 7, and the pivoted stanchion bar 8. This stanchion is freely turnable on lower and upper pivots, the lower pivot consisting of a pintle 9 depending from a medial point of the bracket or arm 6 and turnable freely in the lower beam of the frame 4, and the upper pivot consisting, preferably, of a bolt 10 depending from and turnable in the top beam of the frame, and rigidly connected to the upper arm 7 of the stanchion. The arrangement of this latter pivot could, of course, if desired, be reversed, that is to say, the bolt 10 could be rigidly connected to the top beam of the frame and passed freely through the upper arm 7.

The lower arm or bracket 6 in order to subserve strength is made of metal, and is of the peculiar shape and construction shown. That end of the bracket or arm where the lower end of the stanchion post is connected thereto is provided with an upwardly extending portion 11 which is in the form of a socket, said socket receiving the lower end of the stanchion post, which lower end is firmly connected in the socket by means of headed horizontal bolts 12, 12, which pass through the stanchion post and through the back wall of the socket, the outer ends of said bolts being threaded to receive nuts 13, 13. The opposite end of the bracket or arm 6 is provided with two parallel upwardly extending ears 14, 14, between which is received the lower end of the stanchion bar 8, said lower end being pivoted on a pivot bolt 15 extending across from ear to ear and through the stanchion bar, the ears and pivot bolt being so disposed that the upper end of the stanchion bar may swing toward and away from one of the side beams of the frame 4.

It will be noticed that the upper arm 7 is of such length as to extend within a short distance of one of the side beams of the frame 4, and this upper arm is also provided with an elongated slot 16, which slot extends to within a short distance of the outer end of said arm. Within the slot 16 the upper end of the stanchion bar 8 is adapted to work.

Two arms 17, 17 project inwardly from one of the side beams of the frame, and these arms receive therebetween the upper end of the pivoted stanchion bar, when said bar is turned on its pivot toward the left, or in a direction to throw the upper end of said bar outwardly.

Pivoted on the transverse pin 18 intersecting the outer end of slot 16 is a latch 19. The free end of this latch carries a transverse pin 20, the projecting ends of which are adapted to seat themselves in notches 21, 21, whenever the stanchion bar is turned on its pivot to the limit of its movement in either direction, whereby the extent of the down movement of the free end of the latch is limited. The projecting ends of the pin also serve as handles for lifting the latch.

It will be noticed that the lower arm 6 is curved or deflected downwardly between its ends, as indicated by the numeral 22. This is for the purpose of permitting the animal's neck and head to assume a low position, when the animal is lying down, thereby greatly promoting comfort. The dotted line position of the stanchion bar is the position said bar occupies when the stanchion is open for the insertion of the head of the cow, or other cattle, and it will be noticed that when said bar is in this position the stanchion is locked against turning, by reason of the stanchion bar being between the two arms 17. After the head of an animal is passed through the space between the stanchion bar and post, the upper end of the pivoted stanchion bar is swung inwardly or toward the right. In being thus swung inwardly it bears against the under side of the latch 19, and thereby raises the inner end of said latch, and the moment the upper end of the pivoted bar clears the end of the latch, said latch drops by gravity, and the projecting ends of the pin 20 again seat themselves in the notches 21. The extent of movement of the upper end of bar 8 to the right in this manner is limited by contact of said upper end with the inner end of slot 16, which occurs at the time said bar reaches a perpendicular position. The bar, of course, is held locked in this perpendicular position by the latch 19, and remains in said locked position until the latch is raised by grasping the ends of the pin 20, and exerting a pull upwardly, which is necessary to be done before the pivoted bar can again be swung toward the left or to an open position. The upper end of stanchion bar 8, as clearly shown in Fig. 1, is beveled in a direction to cause the said upper end of the bar to raise the latch when the bar is turned toward the right; and when the bar is turned toward the left, and reaches the limit of its movement in this direction, the beveled upper end of the bar is then clear of the latch 19, so that said latch is permitted to drop and the projecting ends of the pin 20 to engage the notches 21.

What we claim as our invention is:

1. In a cattle stanchion, the combination with a frame, of a stanchion pivoted to the frame, and consisting of a stanchion post, upper and lower arms extending from the stanchion post, the upper arm being longitudinally slotted, and also having a notch or recess in its upper edge, and a stanchion bar pivoted to the lower arm and adapted to be swung toward and away from the stanchion post, the upper end of said bar extending into the slot of the upper arm, of a latch disposed in the slot of the upper arm and pivoted within said slot at the end of said slot which is farthest removed from the stanchion post, the opposite or free end of said latch provided with a laterally extending projection adapted to be normally seated in the notch or recess in the upper edge of the upper arm, to thereby limit the extent of the down movement of the free end of the latch, the said projection also serving as a handle for lifting the latch, and a catch constructed, when the stanchion bar is turned in a direction away from the stanchion post, for holding the stanchion against turning, said stanchion bar, however, when swung toward the stanchion post adapted to bear against the under side of the pivoted latch and raise said latch, the bar when swung to its full extent toward said post passing in advance of the free end of the latch, and thereby permitting said latch to drop and act to lock the bar until the latch is moved upwardly on its pivot by an upward pull on the projection.

2. In a cattle stanchion, the combination with a frame, of a stanchion consisting of a stanchion post, upper and lower arms extending from the stanchion post, the upper arm provided with a pivot extending upwardly into the frame, and said lower arm being of metal, and provided at one end with an upwardly extending end wall and with upwardly extending side walls forming a socket into which the lower end of the stanchion post is fitted, and provided at its opposite end with upwardly extending ears, and having the portion thereof between its ends downwardly depressed or curved, and the under side of said arm provided with a central pivot pintle extending into the frame, horizontal bolts passing through the lower end of the stanchion post and through the end wall of the socket, a stanchion bar having its lower end passing between the ears at one end of the lower arm, and a pivot pin passing through said ears and through the stanchion bar.

In testimony whereof, we affix our signatures, in presence of two witnesses.

FERDINAND NEUMEISTER.
HERMAN C. BURHOP.

Witnesses:
WILLIAM GEELE,
OTTO J. TRILLING.